United States Patent [19]

Verbickas

[11] 4,033,075

[45] July 5, 1977

[54] MECHANISM FOR ADJUSTABLY POSITIONING PLANETARY MACHINING ELEMENTS

[75] Inventor: Robert C. Verbickas, Wolcott, Conn.

[73] Assignee: The Fenn Manufacturing Company, Newington, Conn.

[22] Filed: Oct. 6, 1975

[21] Appl. No.: 619,902

[52] U.S. Cl. .................................... 51/80 A; 51/90; 29/81 F; 29/81 H; 29/81 J; 15/88

[51] Int. Cl.² .......................................... B21C 43/04

[58] Field of Search ................ 29/81 F, 81 J, 81 H; 15/88, 104.04; 51/90, 80 A

[56] References Cited

UNITED STATES PATENTS

| | | | |
|---|---|---|---|
| 1,215,482 | 2/1917 | Chamberlain | 15/88 |
| 2,383,927 | 8/1945 | Carlson | 51/80 A |
| 2,571,632 | 10/1951 | Vinell et al. | 51/90 X |
| 3,304,661 | 2/1967 | Maguire | 51/90 |
| 3,432,971 | 3/1969 | Conti | 51/90 X |
| 3,633,318 | 1/1972 | Olivotto | 51/90 |

*Primary Examiner*—James L. Jones, Jr.
*Assistant Examiner*—K. J. Ramsey
*Attorney, Agent, or Firm*—Prutzman, Hayes, Kalb & Chilton

[57] ABSTRACT

A planetary machining apparatus comprises a rotor and one or more drive spindle assemblies mounted thereon. Each drive spindle assembly includes a rotary spindle support mounted for rotation on the rotor about an axis parallel to and radially spaced from the rotor axis, a drive spindle eccentrically mounted on the spindle support for rotation about an axis radially spaced from the spindle support axis, and a machining element mounted on the drive spindle. A pair of bidirectional hydraulic motors are mounted on the rotor in operative engagement with the spindle supports for angularly adjusting the spindle supports to effect a radial displacement of the drive spindles and the machining elements relative to the axis of the rotor. A control arrangement including a rotary fluid distributor is provided for selectively operating the hydraulic motors during rotor rotation.

14 Claims, 6 Drawing Figures

MECHANISM FOR ADJUSTABLY POSITIONING PLANETARY MACHINING ELEMENTS

BRIEF SUMMARY OF THE INVENTION

The present invention relates generally to machining apparatus having planetary machining elements, as for example for cutting or grinding a workpiece, and more particularly to a mechanism in such machining apparatus for positioning the planetary machining elements.

Machines are known which have one or more planetary machining elements supported on a rotor rotatable about an axis of feed of a piece of feedstock. Typically, the machining elements are rotary cutting tools for machining the surface of the feedstock and the machine includes a mechanism for adjusting the position of the machining elements radially with respect to the feedstock, as may be required by machining element wear or to accommodate feedstock of different diameters.

It is an object of this invention to provide a new and improved machining apparatus for machining feedstock and having a new and improved mechanism for adjustably positioning planetary type machining elements relative to the feedstock. Included in this object is the provision of an improved positioning mechanism for planetary machining elements which is operable for adjusting the planetary machining elements during operation of the machining apparatus. Further included in this object is the inclusion of an adjustment motor which effects the positioning of the machining elements and is supported by the rotor for rotation therewith. Still further included in this object is the provision of an adjustment motor which is hydraulically powered. Included still further in this object is the provision of an adjustment motor control arrangement which is operative while the machining apparatus is operative.

It is another object of the invention to provide an improved positioning mechanism for planetary machining elements which is durable and reliable.

It is a further object of the invention to provide an improved positioning mechanism for planetary machining elements which permits the positioning range of the positioning mechanism to be pre-established.

Other objects will be in part obvious and in part pointed out more in detail hereinafter.

A better understanding of the invention will be obtained from the following detailed description and the accompanying drawings of an illustrative application of the invention.

DESCRIPTION OF A PREFERRED EMBODIMENT

Figure 1:
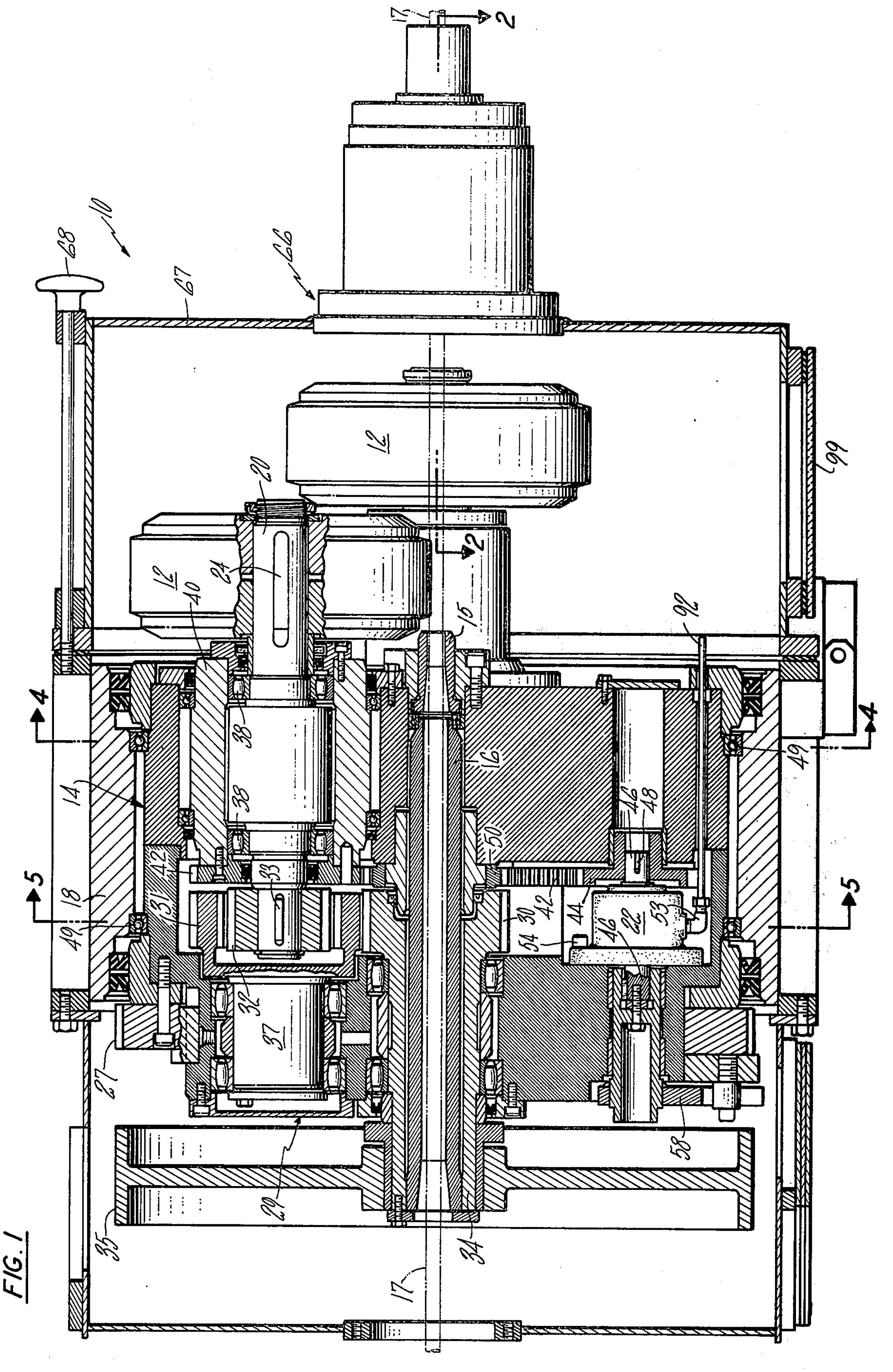
FIG. 1 is a longitudinal section view, partly broken away and partly in section, of a planetary machining apparatus incorporating an embodiment of the present invention.

Referring now to the drawings in detail, the machining apparatus in which the invention is embodied is illustrated in the form of a cutting or descaling machine 10. The cutting machine 10 has four cutting wheels 12 rotatably mounted on a rotor or drum 14 and equiangularly disposed about the axis of rotation of the drum 14. A pair of forward and rear guide tubes 15, 16 coaxial with the drum 14 and providing an axially extending passageway therethrough serve to guide a workpiece or feedstock, such as a metal rod 17, through the machine 10 along the axis of rotation of the drum for being machined by the cutting wheels 12. In the shown embodiment, the guide tubes 15, 16 are mounted within the drum 14 so that they rotate during operation of the machine.

The cutting wheels 12 may be of known construction, as for instance as disclosed in U.S. Pat. No. 3,811,161 issued May 21, 1974 to V. S. Salukvadze for "Rotary Cutting Tool," and for cutting the rod 17 to remove scale or other surface material therefrom. It will be appreciated that the cutting wheels 12 might be replaced with other types of rotary machining elements such as grinding wheels or the like for performing other operations such as grinding, rolling, etc.

The drum 14 is rotatably mounted by bearings 49 in a fixed framework 18 and is comprised of several interconnected annular sections having various axially extending recesses in which are supported adjustment motor means, such as a pair of hydraulic adjustment motors 22 and the axially extending drive shafts or spindles 20 for the respective cutting wheels 12. The cutting wheels 12 are fixed, as by keys 24, coaxially to their respective drive spindles 20, and whereby one pair of diametrically opposed cutting wheels is located immediately axially forwardly of the drum 14 and the other pair of diametrically opposed wheels 12 is located just axially forwardly of the first pair. The drum 14 is rotated by a rotary drive motor 25 which is preferably bidirectional, through a belt 26 and a belt pulley 27 coaxially fixed to the drum 14.

A rotary drive for the drive spindles 20 is provided independently of the drum drive by a rotary drive motor 28, which is also preferably bidirectional, connected to the respective spindles through a two-stage planetary gear system 29 which includes an externally toothed sun gear 30, four internally and externally toothed planetary ring gears 31 and four externally toothed secondary planetary or satellite pinion gears 32, each of which meshes with a respective ring gear 31 and is fixed as by a key 33 coaxially to a respective drive spindle 20.

The sun gear 30 is rotatably mounted coaxially within the drum 14 about the rear guide tube 16 and has an integral drive sleeve 34 extending rearwardly of the drum. A belt pulley 35 is fixed, as by keying, to the rear end of the sun gear drive sleeve 34 and the sun gear 30 is driven by the motor 28 via a belt 36 and the pulley 35. The rear guide tube 16 is press-fit within the sun gear drive sleeve 34 and rotates with the sun gear 30.

Each planetary ring gear 31 has a coaxial stub shaft 37 mounted in the drum 14 for rotation of the rear gear 31 about an axis parallel to the axis of rotation of the sun gear 30 drum 14 and with the external teeth of the ring gear 31 in mesh with the teeth of the sun gear 30. Each satellite pinion 32 is in mesh with the internal teeth of a respective ring gear 31 to permit orbital or planetary motion of the respective spindle 20 relative to the ring gear 31.

The drive motors 25 and 28 may have a fixed or variable speed, their directions of drive may be the same or opposite and they are selectively driven to provide the desired direction and rate of rotation of the drum 14 (and, therefore, the desired direction and rate of planetary movement of the cutting wheels 12 about the workpiece 17) and the desired direction and rate of rotation of the cutting wheels 12.

Figure 4:
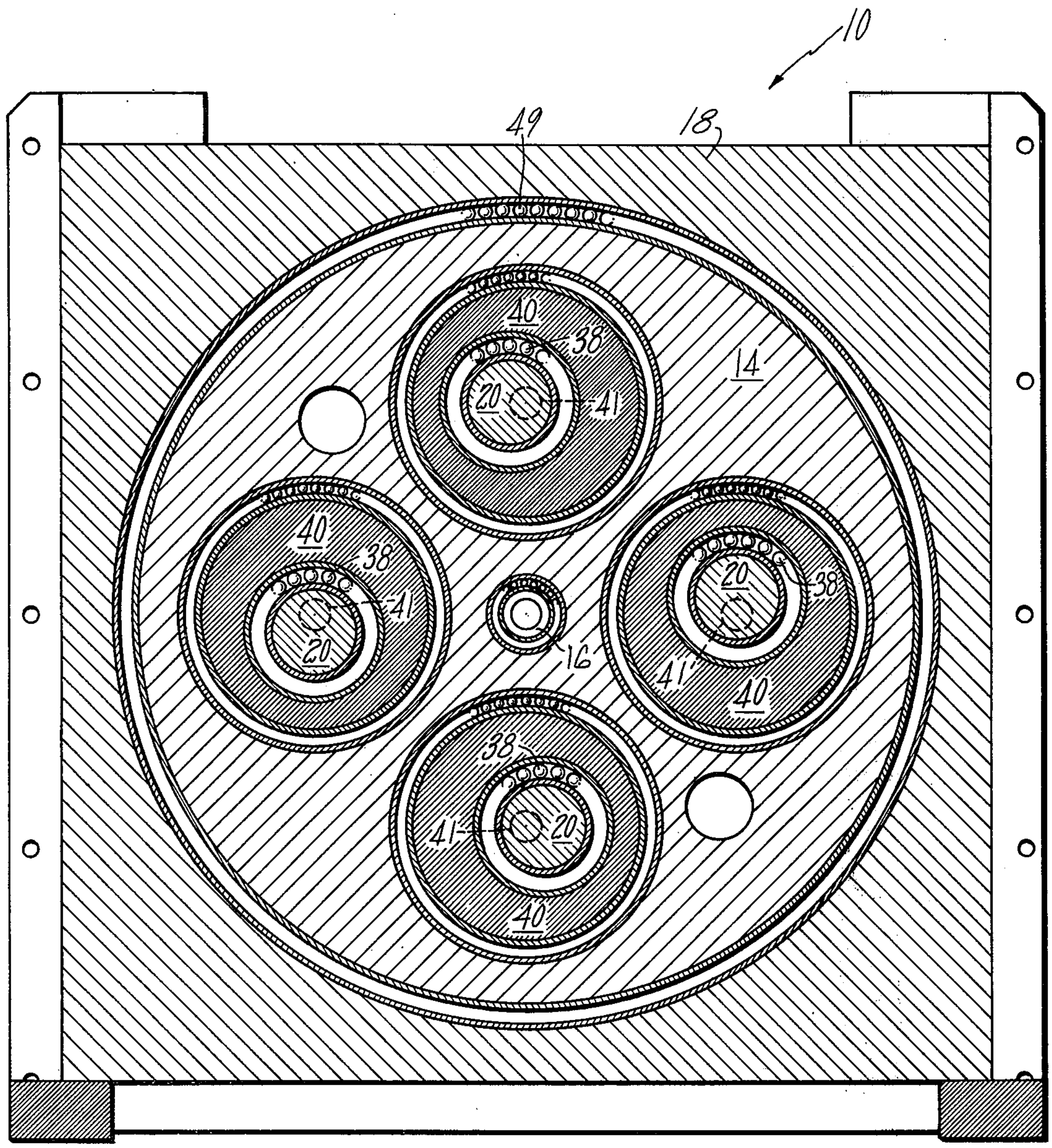
FIG. 4 is a transverse section view, partly in section, taken substantially along line 4—4 of FIG. 1.

Each spindle 20 is rotatably mounted by bearings 38, in a respective eccentric spindle support 40 which is rotatably mounted in the drum 14 forwardly of and coaxially with the respective planetary ring gear 31. The spindle bearings 38 are mounted within the eccentric support 40 for rotation of the spindle 20 about an axis eccentric to the axis of the ring gear 31 and spindle support 40 and such that angular adjustment of the eccentric support 40 effects planetary displacement of the axis of the spindle 20 and its drive gear 32 within the respective ring gear 31 and concomitant radial displacement of the spindle 20 and its cutting wheel 12 relative to the workpiece 17. Such planetary displacement is represented in FIG. 4 by circles 41 of the loci of the axis of the spindles 20 for a complete revolution of the eccentric supports 40. However, each eccentric support 40 is preferably adapted to be rotated only through an angle less than 180° and such that the respective spindle 20 and cutting wheel 12 are adapted to be radially displaced relative to the axis of the drum 14 within a pre-established range and between predetermined maximum and minimum radial positions. The adjustment range is preferably pre-established to avoid adjusting the spindles through their minimum available radial postions and to thereby avoid any possibly resulting interference between the cutting wheels 12 and the stock 17 when the cutting wheels are radially adjusted. Radial adjustment of the cutting wheels may be necessitated by cutting wheel wear and/or to accommodate workpieces 17 of different diameters and/or to facilitate engagement and disengagement of the wheels 12 with the workpiece 17.

An externally toothed annular collar gear 42 is affixed coaxially to each eccentric spindle support 40 for angular adjustment of the spindle support 40 with an adjustment motor 22, as will be hereinafter described, to effect radial displacement of the respective spindle 20 and cutting tool 12 in the direction and magnitude desired.

Two rotary hydraulic motors 22 are mounted by fasteners 54 within suitable cavities within the drum in diametrically opposed relationship and between different spindle supports 40. Each motor 22 has an output or drive gear 44 fixed coaxially to one end of its shaft 46, as by a key 48. The motor shafts 46 extend parallel to the axes of rotation of the eccentric spindle supports 40, and each drive gear 44 is in driving engagement with the collar gears 42 of the adjacent pair of eccentric spindle supports 40. The provision of two motors 22 enhances the reliability of the adjustment mechanism and balances the loading on the motors. Further, a central annular idler gear 50 encircling the guide tube 16 is rotatably mounted coaxially within the drum 14 in engagement with the collar gears 42 of all eccentric spindle supports 40 to interconnect, and thereby synchronize the operation of the four spindle supports 40, even if one of the motors 22 should malfunction in some manner. Also, in the preferred embodiment shown, the eccentric spindle supports 40 are thereby connected to maintain the four spindles 20 at the same radial position relative to the axis of the central workpiece as well as to provide for simultaneous inward and outward radial adjustment of the spindles 20. Alternatively, the spindle supports 40 might be interconnected by the idler gear 50 so that, for example, one pair of diametrically opposed spindles 20 is adjusted in one radial direction while the other pair of spindles 20 is adjusted in the opposite radial direction.

Figure 5:
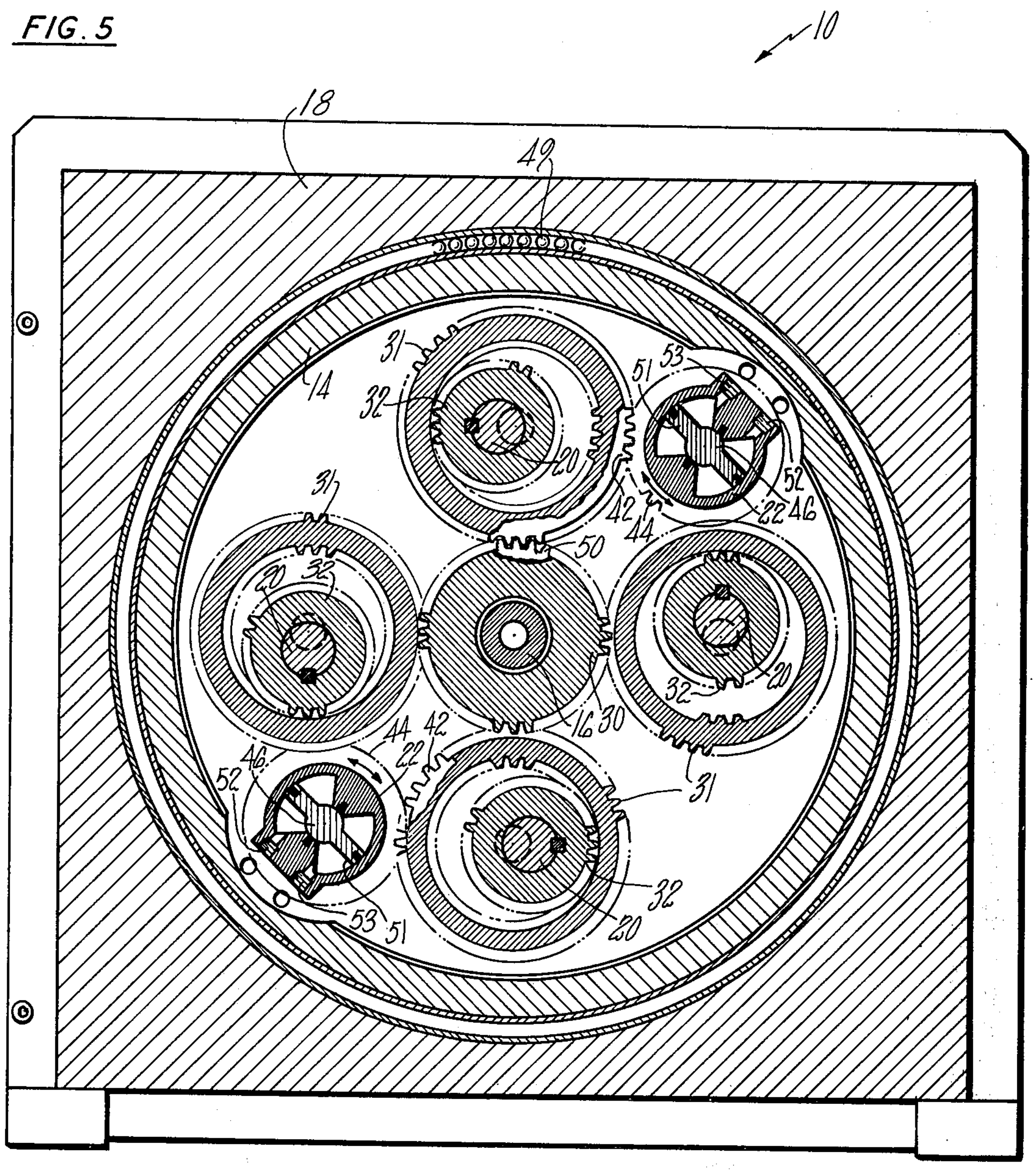
FIG. 5 is a transverse section view, partly broken away and partly in section, taken substantially along line 5—5 of FIG. 1.

As seen in FIG. 5, each motor 22 in the illustrated embodiment of the invention includes a displacement vane 51 fixed to and extending diametrically from the motor shaft 46 within the motor housing, and ports 52 and 53 in the motor housing permit the ingress and egress of selectively controlled hydraulic fluid for displacing the vane 51, and thereby rotating the shaft 46. In the embodiment illustrated, the maximum angular displacement of the shaft 46 is limited to about 90° by the geometry of the vane 51 and the housing of motor 22.

Clockwise rotation of the shaft 46 and thus also drive gear 44 (as viewed in FIG. 5) results in counterclockwise rotation of the collar gears 42 and the respective eccentric supports 40 (as viewed in FIG. 5), and which provides for radial adjustment of the spindles outwardly relative to the position depicted in FIG. 5. Counterclockwise rotation of the shaft 46 (as viewed in FIG. 5) operates to radially adjust the spindles inwardly relative to the position depicted in FIG. 5. In the embodiment shown, the eccentric supports 40 are adapted to be rotated in each angular direction from the radial mid-position shown in FIG. 5 through an angle less than 45° to obtain the desired range control for cleaning the workpiece 17 with the cutters 12.

Figure 6:
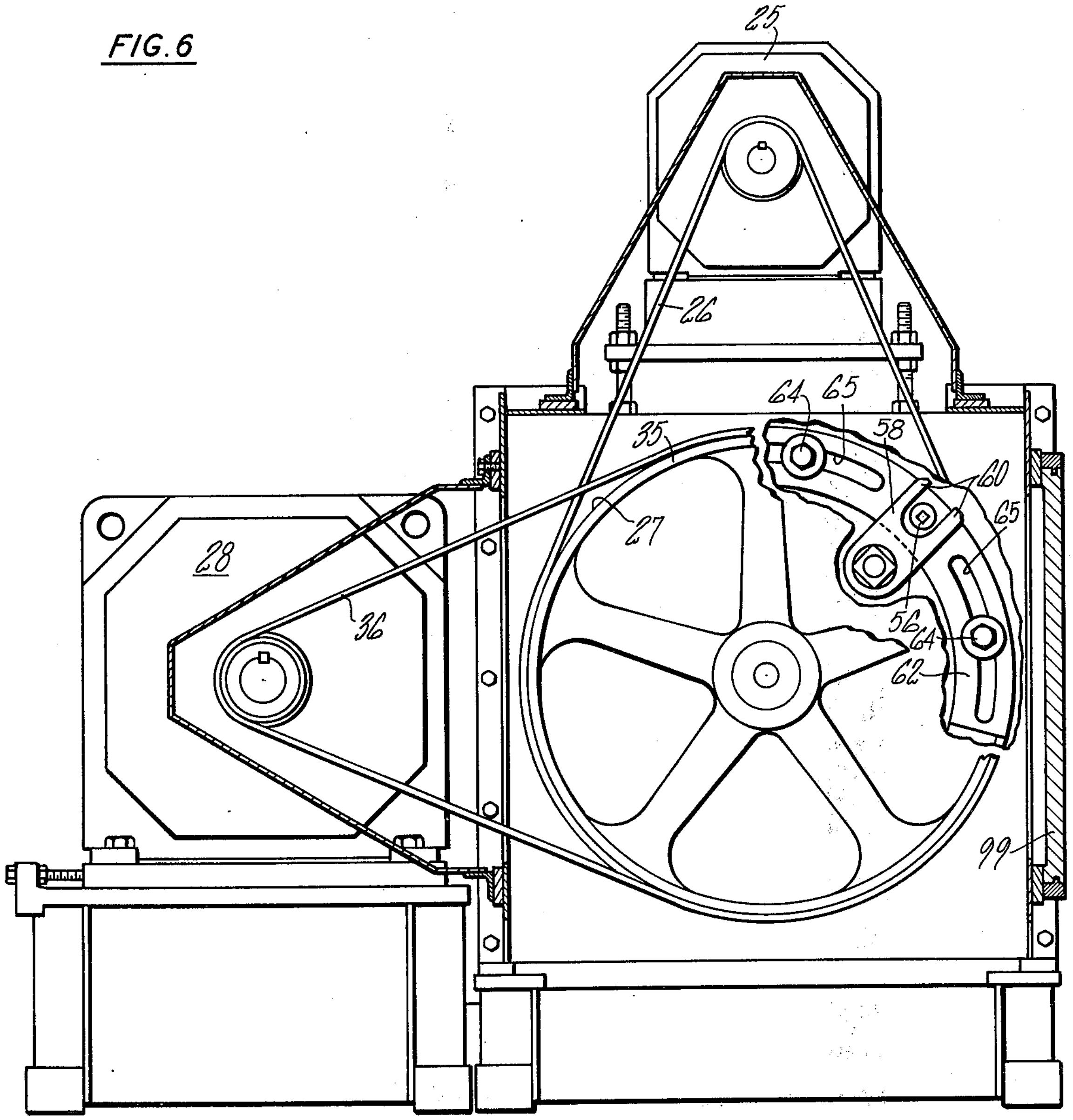
FIG. 6 is a reduced rear end view, partly broken away and partly in section, of the planetary machining apparatus.

Further control and adjustability of the angular displacement of the drive gears 44 is obtained by a lever 58 (seen in FIGS. 1 and 6) which is fixed, as by a key and threaded fastener, to one end of the shaft 46 of one of the motors 22. The lever 58 has an integral yoke 60 at its outer end which embraces an adjustable stop 56. The arms of the yoke 60 are spaced to permit a predetermined angular displacement range of the lever 58, and thus the shaft 46 and the drive gear 44, relative to a given position of the stop 56. The yoke 60 therefore establishes the range of radial displacement of the cutting wheels 12 for any particular position of the stop 56. In the shown embodiment this displacement is somewhat less than the maximum angular displacement of the shaft 46 permitted by the internal geometry of the motor 22.

The stop 56 is mounted on an arcuate slide 62 which is mounted on the drum 14 for circumferential adjustment by a pair of angularly spaced threaded clamping fasteners 64 extending through respective arcuate slots 65 in the slide 62. By loosening the fasteners 64, the angular position of the slide 62 and thus also the stop 56 can be angularly adjusted to adjust the radial operating range of the cutting elements 12. In the illustrated embodiment of the invention, the angular extent of the slots 65 allows the stop 56 to be selectively positioned through an angle of about 90° relative to the respective motor shaft 46. By changing the position of the stop 56, the angular reference position of the shaft 46 and its associated drive gear 44 are changed to shift the operating range established by yoke 60.

The stop 56 is used in one application of the machine as an adjustable initial maximum spindle setting intended to accommodate the general diameter of the feedstock or rod 17 and with the yoke 60 establishing a range of radial inward adjustment of the cutting wheels 12 from the maximum spindle setting for effecting the desired machining of the particular feedstock. It will be appreciated that the single lever 58 and associated stop 56 are operative to shift the angular range of both drive gears 44 in unison through their common engagement with the idler gear 50. Additionally, the adjustment range established by the yoke 60 might be alternatively provided by a pair of angularly spaced stops (not shown) angularly adjustable on the slide 62 and mounted on opposite sides of a simple lever (not shown) extending from the shaft 46.

In accordance with the invention, a header 66 is supported on a closure or cover 67 of the machine which is hinged to the framework 18 near the forward end of the drum 14. The cover 67 is of general cubiform shape for housing the several cutting wheels 12 and prevent dispersal of machining chips and coolant. Suitable fasteners 68 releasably retain the closure 67 in a closed position abutting the framework 18. The forward end of the cover 67 has a central opening coaxial with the drum 14 and guide tubes 15, 16 and a fixed generally tubular outer housing subassembly 69 is mounted on the cover 67 to extend axially forwardly from and about the central opening. The fixed header housing subassembly 69 has an inner multipart sleeve 70 having several axial sections which define in combination with suitable hydraulic fluid seals 78 three axially spaced annular passageways 71, 72 and 73.

The header 66 includes an inner annular rotor 75 rotatably mounted by bearings 76 within the header housing 69 coaxially with the drum 14. The seals 78 on either side of each of the annuli 71–73 extend radially between the sleeve 70 and the rotor 75 to separate the annular fluid passageways 71–73. A centrally apertured annular end closure 74, having a seal 47 is provided at the forward end of the housing 69 for retaining and sealing the rotor 75 within the housing.

Fluid passages 79, 80 and 81 are provided in the housing 69 to extend radially through the housing 69 in registry with the annular passageways 71–73 respectively for connection with external hydraulic fluid circuitry hereinafter described.

Figure 2:
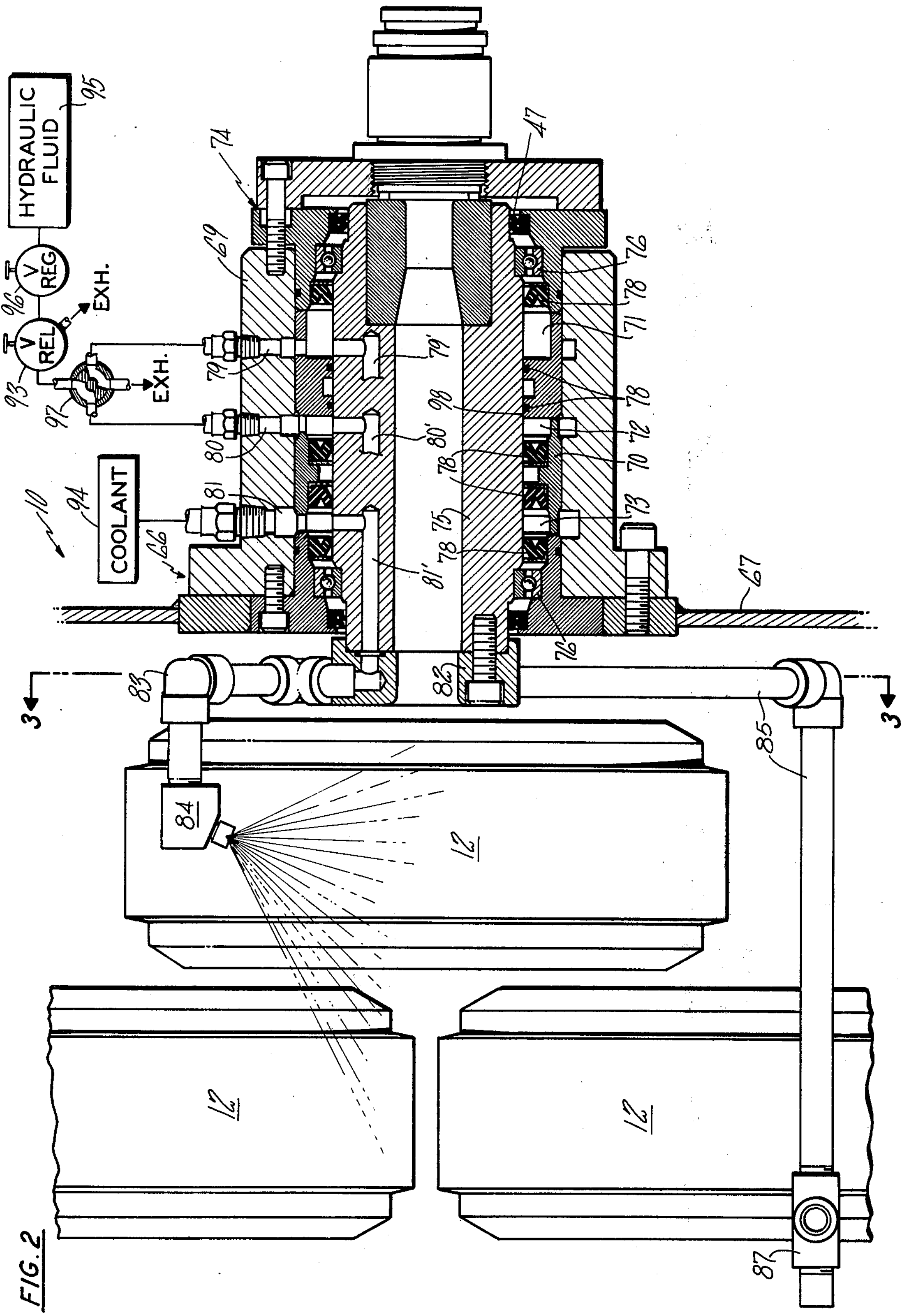
FIG. 2 is an enlarged partial longitudinal section view, partly broken away and partly in section, taken substantially along line 2—2 of FIG. 1.

The rotor 75 projects rearwardly of the forward face of cover 67 to form a rotatable hydraulic distributor hub 82 within the cover 67. Four angularly spaced axially extending fluid conduits or passageways 79′, 80′ and 81′ are provided within the rotor 75 to provide separate fluid connections between the annular passageways 71–73 respectively and corresponding fluid outlets in the distributor hub 82. (The rotor 75 has two angularly spaced conduits 81′ connected to the annular passageway 73, but only one of the conduits 81′ is shown in FIG. 2.)

A pair of rigid tubular conduits 83 are connected to the hub 82 in fluid conducting registry with the two conduits 81′ and extend radially outwardly and axially rearwardly therefrom to nozzles 84 for discharging sprays of coolant onto the cutting wheels 12 and workpiece 17.

Figure 3:
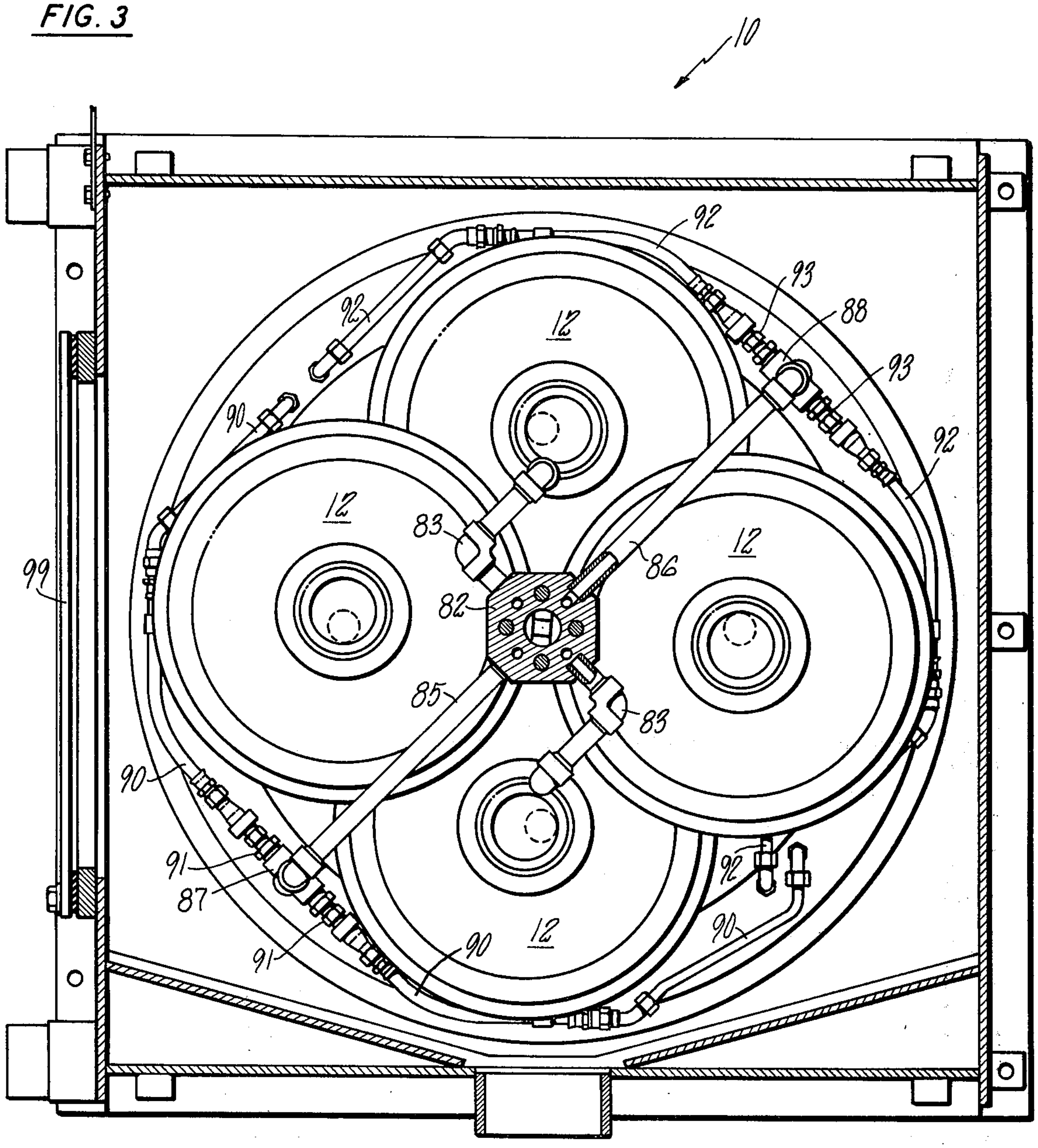
FIG. 3 is a transverse section view, partly in section, taken substantially along line 3—3 of FIG. 2.

According to the invention, the header 66 comprises two rigid tubular distribution conduits 85 and 86 (seen in FIG. 3) connected to the hub 82 in fluid conducting registry with the conduits 79′ and 80′ respectively and extending radially outwardly diametrically opposite of one another to positions at or near the outer radial extents of the cutting wheels 12 and thence axially rearwardly to respective junction blocks 87 and 88 suitably removably mounted against angular displacement on the forward face of the drum 14. A pair of branch conduits 90 fixed to the drum 14 are connected to the junction block 87 by respective quick-disconnect couplings 91 and extend circumferentially in opposite directions therefrom and rearwardly to ports 52 of the motors 22. Similarly, a pair of branch conduits 92 fixed to the drum 14 are connected to the junction block 88 by respective quick-disconnect couplings 93 and extend circumferentially in opposite directions therefrom and rearwardly to the other ports 53 of the motors 22.

Because conduits 85 and 86 are rigid and connected between the drum 14 and the rotor 75, rotation of the drum serves to rotate the rotor 75 therewith, and the annular passageways 71–73 provide continuous liquid communication with the conduits 79′–81′ respectively. As shown schematically in FIG. 2, a source of coolant 94 is connected to conduit 81 in housing 69, and a pressurized hydraulic fluid source 95 is connected via a pressure regulator 96 and a control or selector valve 97 to either conduit 79 or 80 in the header 66, with the other conduit being vented, as determined by the position of the control valve 97. In this manner, the shaft 46 of each motor 22 is hydraulically actuated in one angular direction (in the clockwise direction as viewed in FIG. 5) when the conduit 79 is connected to the fluid pressure source 95, and in an opposite angular direction when the conduit 80 is connected to the fluid pressure source thereby providing bidirectional actuation of each motor 22 and its drive gear 44. The limits of operation are determined, as previously mentioned, by the yoke 60 and stop 56.

When it is necessary to gain access to the cutting wheels 12, as for maintenance or repair, the branch conduits 90 and 92 are disconnected from their respective junction blocks 87 and 88 with the respective couplings 91 and 93, acces to which is gained through a removable observation port 99 in the cover 67. The cover fasteners 68 are then released and the cover 67, including the header 66, is pivoted away from the framework 18.

In the embodiment illustrated in FIG. 2, a manually adjustable pressure relief valve 93 is provided for being set to vent the fluid pressure at some predetermined pressure level. This pressure may be selected to correspond with a desired pressure to be exerted by the cutting wheels 12 on the workpiece 17. In this mode of operation, the control valve 97 is set to connect the fluid source 95 to conduits 80, 85, 86 and motor ports 53 to rotate the motor shafts 46 and their adjustment gears 44 counterclockwise (as viewed in FIG. 5) to a stop limited setting establishing the minimum radial position of the cutter wheels 12. The corresponding minimum diametral spacing of each pair of diametrically opposed cutters is set less than the diameter of the entering workpiece 17 which then forces the cutters 12 outwardly and thus the motor vanes 51 against the source pressure. The resulting increased fluid pressure in the motors 22 is back-vented, or relieved, via the relief valve 93 until an equilibrium pressure is achieved, thereby resulting in the desired cutting pressure. The range of radial displacement of the cutting wheels 12 afforded by the available rotation of the motor shafts 46 is sufficient to allow the cutting wheels 12 to clear the outside diameter of the workpiece 17, if such is required during introduction and/or removal of the workpiece.

Alternatively, the machine might be operated in a mode not requiring a pressure relief valve, wherein the motor gears 44 are hydraulically rotated to stop-limited positions establishing the maximum available radial setting of the cutting wheels 12 for the particular setting of the stop 56. This radial setting of the cutting wheels 12 is selected to correspond with the desired machined diameter of the workpiece 17 and typically presents a small interference with the unmachined diameter of the workpiece.

As will be apparent to persons skilled in the art, various modifications, adaptations and variations of the foregoing specific disclosure can be made without departing from the teachings of the present invention.

I claim:

1. In a planetary machining apparatus having a fixed rotor support, a rotor rotatably mounted on the rotor support, at least one drive spindle assembly having a rotary spindle support mounted on the rotor for angular adjustment about an axis generally parallel to and radially offset from the rotor axis and a drive spindle rotatably mounted on the spindle support for rotation about an axis parallel to and radially offset from the axis of the spindle support, a machining element mounted on each drive spindle, adjustment means for angularly adjusting each rotary spindle support for radially adjusting the respective spindle and machining element relative to the rotor axis, and drive means for rotating the rotor and each drive spindle for respectively providing planetary movement of each machining element about the rotor axis and rotation of each machining element about its spindle axis, the improvement wherein the adjustment means comprises bidirectional motor means operative in opposite directions thereof and mounted on the rotor for rotation therewith, transmission means operatively connecting the motor means to each spindle support for angularly adjusting each spindle support in its opposite angular directions by operation of the motor means in its opposite operative directions respectively, stationary selector means and connector means operatively connecting the selector means to the motor means, the selector means and connector means being operable for selectively operating the bidirectional motor means in each operative direction thereof during rotation of the rotor, said drive means comprising a planetary system having a first gear mounted for rotation coaxially with and relative to the rotor, an internally and externally toothed planetary ring gear for each drive spindle assembly, each ring gear being rotatably mounted on said drum for rotation about an axis coaxial with the respective rotary spindle support and with the external teeth of said ring gear in engagement with said first gear for planetary movement of said ring gear about the rotor axis upon rotation of the rotor, and a secondary planetary drive pinion secured to each drive spindle coaxially therewith and in engagement with the internal teeth of the respective ring gear for planetary motion relative to the ring gear axis upon angular adjustment of the respective spindle support.

2. In a planetary machining apparatus having a fixed rotor support, a rotor rotatably mounted on the rotor support, at least one drive spindle assembly having a rotary spindle support mounted on the rotor for angular adjustment about an axis generally parallel to and radially offset from the rotor axis and a drive spindle rotatably mounted on the spindle support for rotation about an axis parallel to and radially offset from the axis of the spindle support, a machining element mounted on each drive spindle, adjustment means for angularly adjusting each rotary spindle support for radially adjusting the respective spindle and machining element relative to the rotor axis, and drive means for rotating the rotor and each drive spindle for respectively providing planetary movement of each machining element about the rotor axis and rotation of each machining element about its spindle axis, the improvement wherein the adjustment means comprise bidirectional motor means operative in opposite directions thereof and mounted on the rotor for rotation therewith, transmission means operatively connecting the motor means to each spindle support for angularly adjusting each spindle support in its opposite angular directions by operation of the motor means in its opposite operative directions respectively, stationary selector means and connector means operatively connecting the selector means to the motor means, the selector means and connector means being operable for selectively operating the bidirectional motor means in each operative direction thereof during rotation of the rotor, said motor means comprising a bidirectional hydraulic motor responsive to hydraulic fluid pressure for operation of the motor in at least one operative direction thereof, said connector means including rotatable fluid conduit means and stationary fluid conduit means, said rotatable conduit means being operatively connected to said hydraulic motor and mounted on said rotor for rotation therewith, said stationary fluid conduit means being operatively connected in continuous fluid communication with said rotatable conduit means, and said selector means being connected to said stationary fluid conduit means for selectively controlling the flow of fluid therethrough, thereby to control the fluid pressure applied to said hydraulic motor, the stationary fluid conduit means comprising a stationary header supported by said fixed rotor support, said stationary header having a cylindrical bore coaxial with the rotor axis and first fluid passageways in communication with said bore, the rotating fluid conduit means comprising a distributor rotor rotatably mounted within said cylindrical bore of the header coaxially with the rotor, the distributor rotor having a second fluid passageways in fluid communication via the bore with the first fluid passageways respectively, the first and second fluid passageways comprising annular groove means in one of said stationary header and said distributor rotor, said annular groove mean providing continuous fluid communication between said first and second fluid passageways respectively, said fixed rotor support comprising a cover member removably disposed about each machining element, said stationary header being mounted on said cover member, said distributor rotor being axially retained within said bore in said stationary header and said rotatable fluid conduit means including releasable coupling means intermediate said distributor rotor and said motor means to permit removal of said cover member from said machining elements.

3. In a planetary machining apparatus having a fixed rotor support, a rotor rotatably mounted on the rotor support, at least one drive spindle assembly having a rotary spindle support mounted on the rotor for angular adjustment about an axis generally parallel to and radially offset from the rotor axis and a drive spindle rotatably mounted on the spindle support for rotation about an axis parallel to and radially offset from the axis of the spindle support, a machining element mounted on each drive spindle, adjustment means for angularly adjusting each rotary spindle support for radially adjusting the respective spindle and machining element relative to the rotor axis, and drive means for rotating the rotor and each drive spindle for respectively providing planetary movement of each machining element about the rotor axis and rotation of each machining element about its spindle axis, the improvement wherein the adjustment means comprises bidirectional motor means operative in opposite directions thereof and mounted on the rotor for rotation therewith, transmission means operatively connecting the motor means to each spindle support for angularly adjusting each spindle support in its opposite angular directions by operation of the motor means in its opposite operative directions respectively, stationary selector means and connector means operatively connecting the selector means to the motor means, the selector means and connector means being operable for selectively operating the bidirectional motor means in each operative direction thereof during rotation of the rotor, the apparatus comprising at least two of said drive spindle assemblies, the bidirectional motor means comprising at least two bidirectional motors, and said transmission means comprising first and second separate transmission means operatively connecting said two bidirectional motors to the spindle supports of said two drive spindle assemblies respectively for angular adjustment thereof.

4. In a planetary machining apparatus having a fixed rotor support, a rotor rotatably mounted on the rotor support, at least one drive spindle assembly having a rotary spindle support mounted on the rotor for angular adjustment about an axis generally parallel to and radially offset from the rotor axis and a drive spindle rotatably mounted on the spindle for rotation about an axis parallel to and radially offset from the axis of the spindle support, a machining element mounted on each drive spindle, adjustment means for angularly adjusting each rotary spindle support for radially adjusting the respective spindle and machining element relative to the rotor axis, and drive means for rotating the rotor and each drive spindle for respectively providing planetary movement of each machining element about the rotor axis and rotation of each machining element about its spindle axis, the improvement wherein the adjustment means comprises bidirectional motor means operative in opposite directions thereof and mounted on the rotor for rotation therewith, transmission means operatively connecting the motor means to each spindle support for angularly adjusting each spindle support in its opposite angular directions by operation of the motor means in its opposite operative directions respectively, stationary selector means and connector means operatively connecting the selector means to the motor means, the selector means and connector means being operable for selectively operating the bidirectional motor means in each operative direction thereof during rotation of the rotor, the apparatus comprising first and second pairs of said drive spindle assemblies, each having a pair of diametrically opposed dirve spindles equally radially spaced from the rotor axis, said bidirectional motor means comprising first and second bidirectional motors, and said transmission means comprising first and second separate transmission means respectively operatively connecting the first and second bidirectional motors to the spindle supports of said first and second pairs of drive spindle assemblies for angular adjustment thereof.

5. The planetary machining apparatus of claim 1 wherein said motor means comprises a bidirectional hydraulic motor responsive to hydraulic fluid pressure for operation of the motor in at least one operative direction thereof, said connector means including rotatable fluid conduit means and stationary fluid conduit means, said rotatable conduit means being operatively connected to said hydraulic motor and mounted on said rotor for rotation therewith, said stationary fluid conduit means being operatively connected in continuous fluid communication with said rotatable conduit means, and said selector means being connected to said stationary fluid conduit means for selectively controlling the flow of fluid therethrough, thereby to control the fluid pressure applied to said hydraulic motor.

6. The planetary machining apparatus of claim 5 wherein the stationary fluid conduit means comprises a stationary header supported by said fixed rotor support, said stationary header having a cylindrical bore coaxial with the rotor axis and first fluid passageways in communication with said bore, the rotating fluid conduit means comprising a distributor rotor rotatably mounted within said cylindrical bore of the header coaxially with the rotor, the distributor rotor having second fluid pasageways in fluid communication via the bore with the first fluid passageways respectively, the first and second fluid passageways comprising annular groove means in one of said stationary header and said distributor rotor, said annular groove means providing continuous fluid communication between said first and said second fluid passageways respectively.

7. The planetary machining apparatus of claim 5 wherein said motor means has fluid intake and exhaust ports respectively for hydraulically operating the motor means in its said one operative direction, said rotatable conduit means comprising a pair of rotatable conduits connected to said motor ports respectively, and said stationary fluid conduit means comprising a pair of stationary fluid conduits in continuous fluid communication with said pair of rotatable conduits respectively.

8. The planetary machining apparatus of claim 1 wherein said bidirectional motor means comprises rotatable drive shaft means rotatable in opposite angular directions upon operation of the motor means in its opposite directions, said transmission means comprising gear means connecting the drive shaft means to each spindle support for angular adjustment of each spindle support with the motor means, and wherein the apparatus further comprises limit means for limiting the angular displacement of the drive shaft means in each angular direction thereof for limiting the angular adjustment of each spindle support.

9. The planetary machining apparatus of claim 1 further comprising adjustable limit means for limiting the operation of the bidirectional motor means in each operative direction thereof for limiting the angular adjustment of each spindle support in each angular direction thereof. .

10. The planetary machining apparatus of claim 1 wherein said first gear is a sun gear.

11. The planetary machining apparatus of claim 1 wherein the apparatus comprises a plurality of said drive spindle assemblies with respective spindle supports equally radially spaced from the rotor axis, a connecting gear rotatably mounted on the rotor coaxially therewith, and a spindle support gear mounted on each of the spindle supports coaxially therewith and in engagement with the connecting gear to provide for angular adjustment of the rotor supports in synchronism.

12. In a planetary machining apparatus having a fixed rotor support, a rotor rotatably mounted on the rotor support, at least one drive spindle assembly having a rotary spindle support mounted on the rotor for angular adjustment about an axis generally parallel to and radially offset from the rotor axis and a drive spindle rotatably mounted on the spindle support for rotation about an axis parallel to and radially offset from the axis of the spindle support, a machining element mounted on each drive spindle, adjustment means for angularly adjusting each rotary spindle support for radially adjusting the respective spindle and machining element relative to the rotor axis, and drive means for rotating the rotor and each drive spindle for respectively providing planetary movement of each machining element about the rotor axis and rotation of each machining element about its spindle axis, the improvement wherein said drive means comprises a first gear coaxial with the rotor axis and mounted for rotation relative to the rotor, and a planetary drive system for each drive spindle assembly comprising an internally and externally toothed planetary ring gear rotatably mounted on said rotor coaxially with the respective rotary spindle support and with the external teeth of said ring gear in engagement with said first gear for providing planetary movement of said ring gear about the rotor axis and rotation of the ring gear about its axis, and a secondary planetary drive pinion secured to the respective drive spindle coaxially therewith and in engagement with the internal teeth of the ring gear for planetary motion relative to the axis of the ring gear; and wherein the adjustment means comprises bidirectional motor means operative in opposite directions thereof and mounted on the rotor for rotation therewith, and transmission means operatively connecting the bidirectional motor means to each spindle support for angular adjustment thereof in opposite angular directions by operation of the motor means in its opposite operative directions respectively, and control means for selectively operating the bidirectional motor means in each operative direction thereof during rotation of the rotor.

13. The planetary machining apparatus of claim 12 wherein the apparatus comprises at least two of said drive spindle assemblies, wherein said bidirectional motor means comprises at least two bidirectional motors, and wherein said transmission means comprises first and second transmission means operatively connecting the two bidirectional motors to the spindle supports of said two drive spindle assemblies respectively for angular adjustment thereof.

14. The planetary machining apparatus of claim 12 wherein the apparatus comprises first and second pairs of drive spindle assemblies, each having a pair of diametrically opposed drive spindles equally radially spaced from the rotor axis, wherein said bidirectional motor means comprises first and second bidirectional motors, and wherein said transmission means comprises first and second transmission means operatively connecting said first and second bidirectional motors to the spindle supports of said first and second drive spindle assemblies respectively for angular adjustment thereof.

* * * * *